(12) United States Patent
Petersen

(10) Patent No.: US 8,676,502 B2
(45) Date of Patent: Mar. 18, 2014

(54) GPS NAVIGATION AND CELLULAR ROUTE PLANNING DEVICE

(76) Inventor: Sean Petersen, Lakeland, FL (US)

( * ) Notice: Subject to any disclaimer, the term of this patent is extended or adjusted under 35 U.S.C. 154(b) by 137 days.

(21) Appl. No.: 12/957,712

(22) Filed: Dec. 1, 2010

(65) Prior Publication Data

US 2012/0143499 A1 Jun. 7, 2012

(51) Int. Cl.
*G01C 21/00* (2006.01)
*G01S 1/00* (2006.01)

(52) U.S. Cl.
USPC ........... 701/483; 701/400; 701/409; 701/468; 455/446

(58) Field of Classification Search
USPC ............. 701/400, 408, 409, 412, 468, 537; 455/446, 63.2, 115.3, 226.2, 513, 455/154.1
See application file for complete search history.

(56) References Cited

U.S. PATENT DOCUMENTS

| | | | |
|---|---|---|---|
| 5,546,092 A | 8/1996 | Kurokawa | |
| 6,266,514 B1 * | 7/2001 | O'Donnell | 455/67.13 |
| 6,336,035 B1 * | 1/2002 | Somoza et al. | 455/446 |
| 7,047,113 B1 | 5/2006 | Burch | |
| 7,158,790 B1 * | 1/2007 | Elliott | 455/446 |
| 7,609,678 B2 | 10/2009 | Sharma | |
| 7,925,436 B2 * | 4/2011 | Blackwood | 701/420 |
| 8,295,853 B2 * | 10/2012 | Heikkila et al. | 455/456.1 |
| 8,314,683 B2 * | 11/2012 | Pfeffer | 340/7.3 |
| 2006/0259236 A1 * | 11/2006 | Kaplan | 701/208 |
| 2007/0123271 A1 | 5/2007 | Dickinson | |
| 2007/0213925 A1 * | 9/2007 | Sharma et al. | 701/201 |
| 2008/0113683 A1 * | 5/2008 | Paas et al. | 455/552.1 |
| 2008/0167078 A1 * | 7/2008 | Eibye | 455/566 |
| 2008/0319652 A1 | 12/2008 | Moshfeghi | |
| 2009/0191892 A1 | 7/2009 | Kelley | |
| 2010/0036599 A1 | 2/2010 | Froeberg | |

* cited by examiner

*Primary Examiner* — Rami Khatib
(74) *Attorney, Agent, or Firm* — Daniel Law Offices, P.A.; Jason T. Daniel, Esq.

(57) ABSTRACT

A navigation device for navigating from one location to another includes a GPS receiver for receiving GPS signals, a cellular receiver for receiving cellular signals, a memory, a processor, a display unit and a connection unit for receiving navigation data. The navigation data includes geographic and cellular provider information pertaining to the locations where cellular coverage is available by a particular provider. This information is processed by the processor to display route instructions to a user in which cellular coverage will be maintained.

18 Claims, 6 Drawing Sheets

GPS NAVIGATION AND CELLULAR ROUTE PLANNING DEVICE

BACKGROUND

Field of the Invention

The present invention relates generally to a global positioning navigation device, and more particularly to a GPS navigation device having an integrated cellular detection and route planning module.

With the recent availability of low cost GPS navigation units, more and more people are hitting the open roads and choosing to drive instead of fly. As such, people are often driving through unfamiliar areas where a vehicle breakdown or medical emergency can emphasize the need for reliable cellular communication throughout the journey. However, if the user is traveling through a distant town or remote area, they may find that their cellular telephone provider does not offer service in the area in which they are located. Unfortunately, it is common for the user to discover this fact at a time when the cellular telephone is needed the most.

Accordingly, the need exists for a GPS system capable of incorporating the coverage details of a predetermined cellular provider into the driving instructions given to the user without the need to connect to a remote server. Moreover, it is also an objective to provide a portable GPS navigation unit capable of displaying a list of available cellular providers and the related cellular provider information during a journey.

SUMMARY OF THE INVENTION

The present invention is directed to a GPS navigation device having an integrated cellular detection and route planning module. One embodiment of the present invention can include a portable GPS receiver having an integrated GPS and cellular receivers for receiving GPS and cellular signals, a memory, a processor, a display unit and a connection unit for receiving navigation data. The navigation data can include geographic and cellular provider information pertaining to the locations where cellular coverage is available by a particular provider. This information can be processed by the processor to display route instructions to a user in which cellular coverage will be maintained.

Another embodiment of the present invention can include a portable GPS navigation device capable of displaying real time cellular provider information via the cellular antenna.

Yet another embodiment of the present invention can include a portable GPS navigation device capable of comparing the real time cellular provider information with the navigation data to determine a delta.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
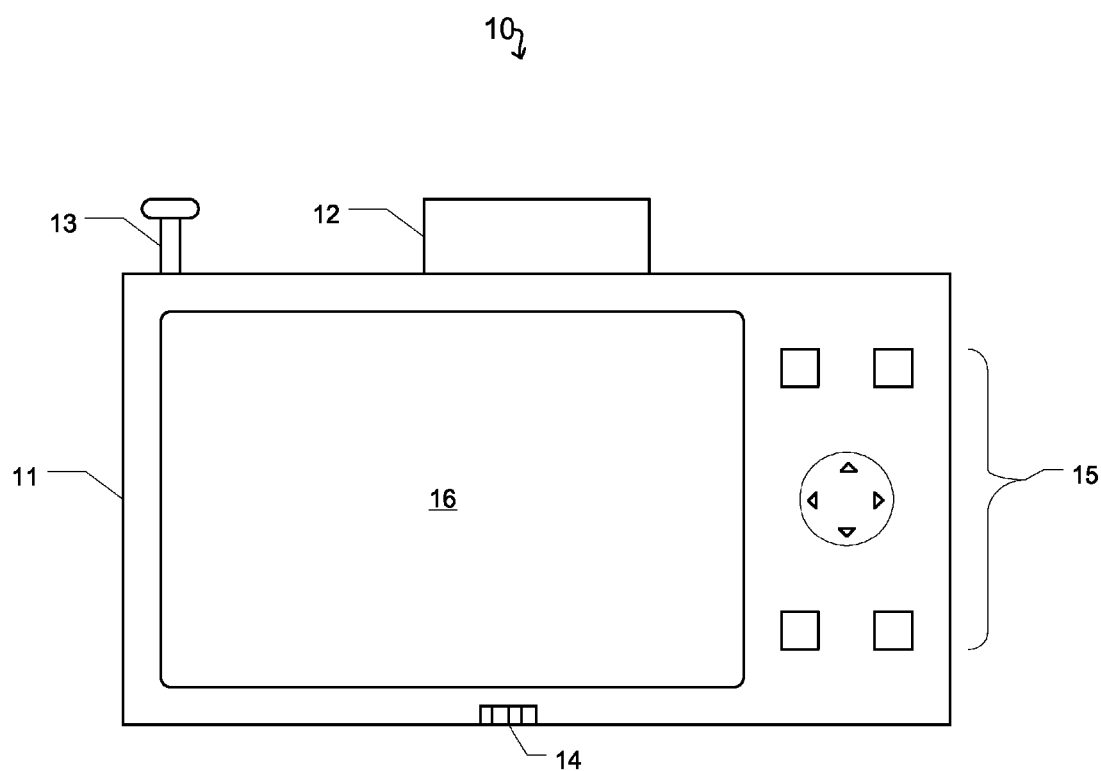
FIG. 1 is a frontal perspective view of a GPS navigation and cellular route planning device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be described throughout this specification, the inventive concepts can be linked with a conventional GPS navigation device capable of identifying the current location of the unit and providing destination instructions to a user. Portable GPS units of this type are extremely well known in the art, and include U.S. Pat. No. 5,546,092, for example, the contents of which are incorporated herein by reference. Accordingly, any suitable GPS system capable of performing the actions disclosed herein can be utilized in conjunction with the teachings of this specification without deviating from the scope and spirit of the invention.

Although described throughout this specification as generating driving instructions, it will be understood that any directions for moving from one location to another via the ground, air, or sea are contemplated. Accordingly, this term is not intended to be limiting in any way.

FIG. 1 illustrates one embodiment of a GPS navigation and cellular route planning device 10 that is useful for understanding the inventive concepts disclosed herein. As shown, device 10 can include a portable housing 11, a GPS antenna 12, a cellular antenna 13, an Input/Output device 14, a keypad 15 and a display screen 16.

Figure 2:
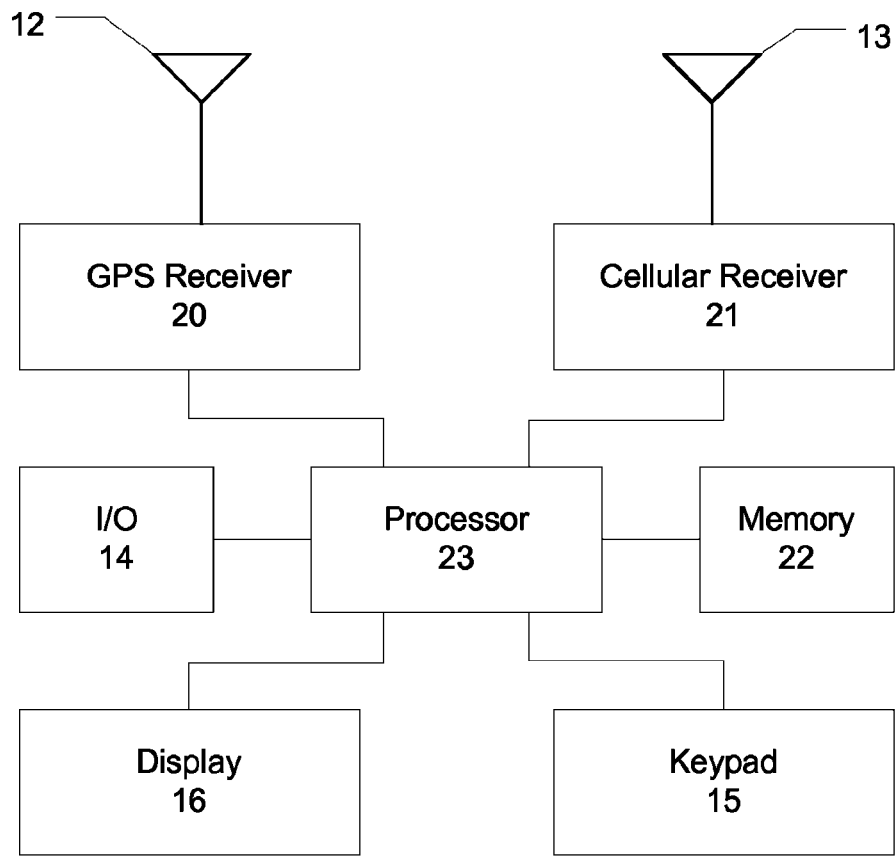
FIG. 2 is a circuitry block diagram of the GPS navigation and cellular route planning device according to one embodiment.

FIG. 2 illustrates one embodiment of a circuitry block diagram of the GPS Unit 10 described above. As shown, the internal components can include a GPS antenna 12, cellular antenna 13, I/O unit 14, keypad 15, display 16, GPS receiver 20, cellular receiver 21, memory 22 and a processor 23.

The GPS antenna 12 can act to interface with one or more satellites in order to receive location information of the unit at any given time. Antenna's of this type are well known in the art.

The GPS receiver 20 can act to receive the location information from the GPS antenna 12 and translate it into data which can be sent to the processor 23 for calculating route information. Additionally, this information can be sent to the display screen 16 for providing instant location information to the user.

The cellular antenna 13 can act to interface with any local cellular towers in order to receive information pertaining to what (if any) cellular providers are operating in the area in which the GPS device 10 is located. In one embodiment, the cellular antenna can also collect other information pertaining to each cellular provider, including: cellular signal strength, network type, and other services offered by each identified provider.

The cellular receiver 21 can act to receive the information from the cellular antenna and provide this information to the processor 23 and the memory 22. Additionally, this information can be sent to the display screen 16 for providing instant cellular provider information to the user.

I/O unit 14 can act to allow the GPS device 10 to connect with a computer or other external device in order to receive map updates and cellular routing information. To this end, I/O unit 14 can preferably include a module for receiving a data cable that can be connected to a computer or other remote device.

As described herein, cellular routing information can include, among other information, cellular coverage maps which are typically generated by cellular providers to notify the public of where their service is available. To this end, a cellular coverage map can include geographic details such as street, city and state information specifying where service is and is not available. Through the use of cellular coverage maps, it is possible to select a particular address or location (such as longitude and latitude, for example) and the map can identify if cellular coverage is available at this location. Cellular maps and their associated methodology are well known in the art, and include U.S. Pat. No. 6,266,514, for example, the contents of which are incorporated herein by reference.

In addition to the above, cellular routing information can also include: cellular tower locations, network types (i.e. analogue, digital, 3G, 4G, EDGE, TDMA, CDMA and GSM, for example) and other related cellular provider information. Moreover, as will be described below in greater detail, the I/O unit 14 can also upload cellular provider information captured by the device when this information differs from that contained in the original download.

The keypad 15 can include any known means for accepting user input and providing instructions to the processor. As shown in FIG. 1, the keypad can include one or more push buttons for interfacing with the device. However, other means are also contemplated.

The display screen 16 can act to receive and display maps and other user requested information in a variety of formats. This information can be requested by the user and displayed according to any number of known methods. In one preferred embodiment, display screen 16 can include an LCD touch screen capable of providing two way communication with the user and the processor 23.

Memory 22 can act to store map and cellular information in addition to operating instructions in the form of program code for the processor 23 to execute. Although illustrated as a single component, memory 22 can include one or more physical memory devices such as, for example, local memory and one or more bulk storage devices. As used herein, local memory can refer to random access memory or other non-persistent memory device(s) generally used during actual execution of program code, whereas a bulk storage device can be implemented as a persistent data storage device. Additionally memory 22 can also include one or more cache memories that provide temporary storage of at least some program code in order to reduce the number of times program code must be retrieved from bulk storage device during execution. Each of these devices being well known in the art, no further description will be provided.

The Processor 23 can act to execute the program code stored in the memory 22. To this end, the processor can access map, cellular and present location information, and can generate driving instructions based on the desired destination provided by the user. This information can then be sent to the display screen 16 in any number of formats as described above.

In operation, the GPS navigation and cellular route planning device 10, can generate driving instructions based on a number of user preferences including cellular availability. To this end, the device 10, according to one embodiment can receive geographic maps and cellular routing information (such as a cellular map, for example) via the I/O unit 14. This information can be pre-programmed into the unit at a time of construction or can be downloaded by the end user at a time of purchase. Additionally, as with the maps, yearly updates can be available for download to the device. In any case, once this cellular routing information is received by the unit, it can be stored in the memory 22 for use by the processor in order to provide driving instructions to a desired destination as described below.

Figure 3:
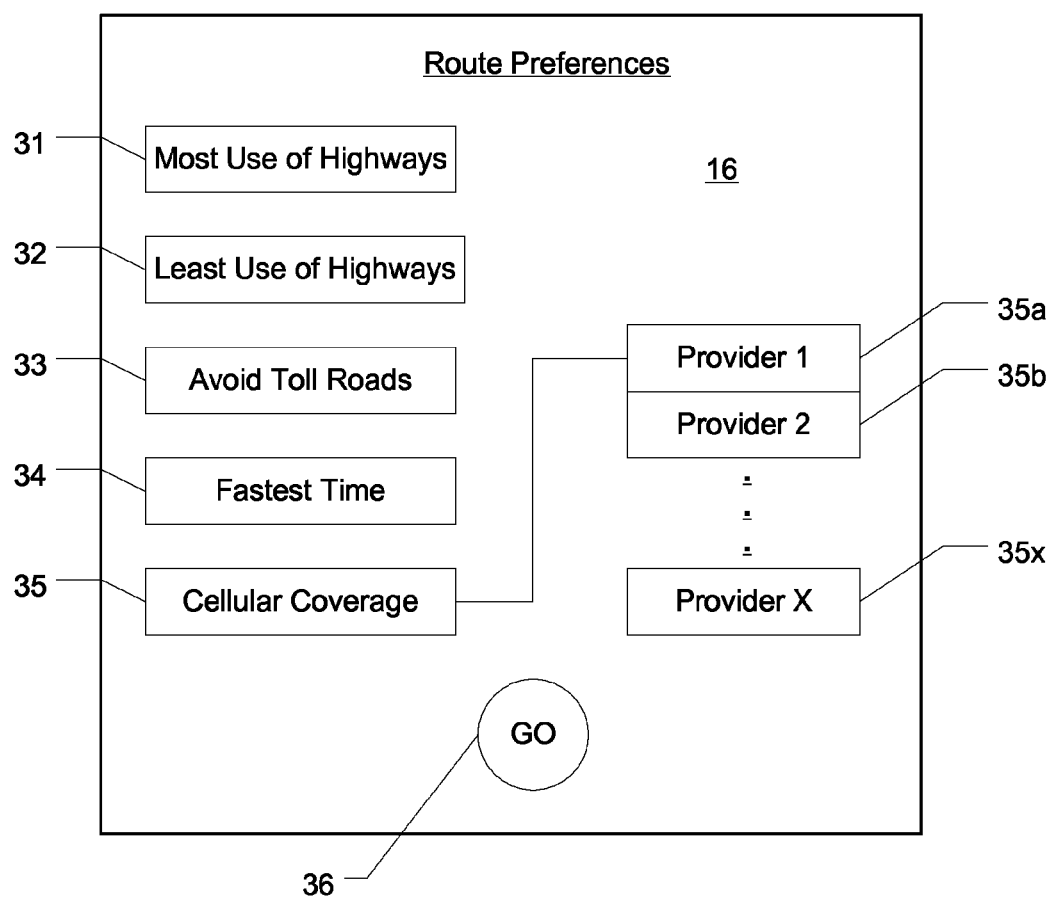
FIG. 3 is a front view of the screen of the GPS navigation and cellular route planning device according to one embodiment.

FIG. 3 illustrates one embodiment of the screen 16 providing a user with a list of routing preferences. In this example, the routing preferences include Most use of highways 31, Least use of highways 32, Avoid toll roads 33, Fastest time 34 and Cellular availability 35. Options 31-34 are but a few of the most commonly available options for known GPS units, and are provided for illustrative purposes.

When a user selects option 35, the display can generate a second screen in which a list of cellular providers (35a-35x) whose coverage maps have been pre-loaded into the device 10 can be displayed. Upon selecting their cellular provider, the user can commence the route planning (i.e. generation of driving instructions by the processor) by selecting the Go button 36. At this time, the processor 23 can generate a travel route that will guide the user to their desired destination utilizing roads that are indicated by the cellular map as having cellular coverage for that provider.

Moreover, by storing the cellular maps within the memory of the GPS, it is possible for route planning and alternate (i.e. detour) route with cellular coverage to occur without the need to connect to an outside device.

Although illustrated above as a self contained device, the inventive concepts disclosed herein are not so limiting. To this end, it is noted that the present invention can be embodied as a stand alone portable device or can be incorporated into a larger device/system or vehicle (such as a car, boat or airplane, for example). The device 10 can thus be incorporated as a single component or as multiple individual components that are communicatively linked to perform the functions described herein.

Figure 4:
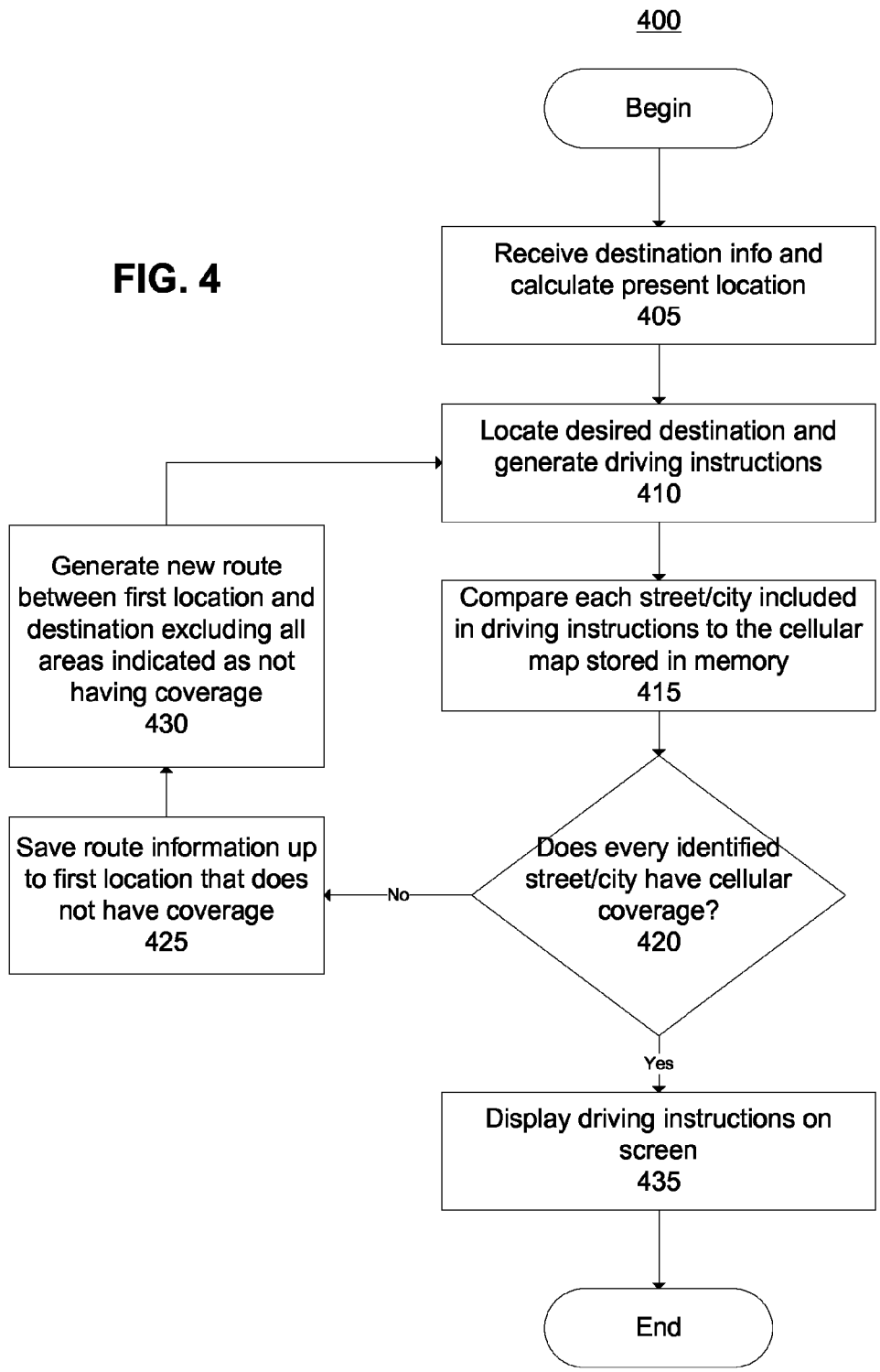
FIG. 4 is a flow chart illustrating one exemplary method for determining a travel route with cellular availability utilizing the GPS navigation and cellular route planning device.

FIG. 4 is a flow chart illustrating one exemplary method for determining a travel route with cellular availability utilizing the GPS navigation and cellular route planning device described above. As would be understood by one of skill in the art, the method described below is but one example, and other methods are also contemplated.

The method 400 can begin at step 405 where the user can input the destination information and the device 10 can calculate the present location based on the signal received from the GPS antenna 12. Next, the method can proceed to step 410 where the device can locate the destination location within the internal maps stored in the memory 22, and generate a set of driving instructions.

Next, the method can proceed to step 415 where each street/city along the driving instructions can be compared to the cellular routing information (such as the cellular map, for example) of a predetermined cellular provider. In step 420, a determination can be made as to whether any of the streets or cities along the proposed route are indicated as not having cellular service. If the determination is made that one or more streets/cities do not have cellular coverage, the method can proceed to step 425 where the route information from the current location to the first identified location can be saved. Next, the method can proceed to step 430, where a new route from the first location identified as not having cellular service to the destination can be generated and an instruction can be included to exclude all route locations identified in step 420 as not having cellular coverage. Upon completion of step 420, the method can return to step 415.

Once a travel route is identified in step 420 as having cellular coverage throughout the entire route, the method can proceed to step 435, where the driving instructions can be displayed on the screen 16.

Figure 5:
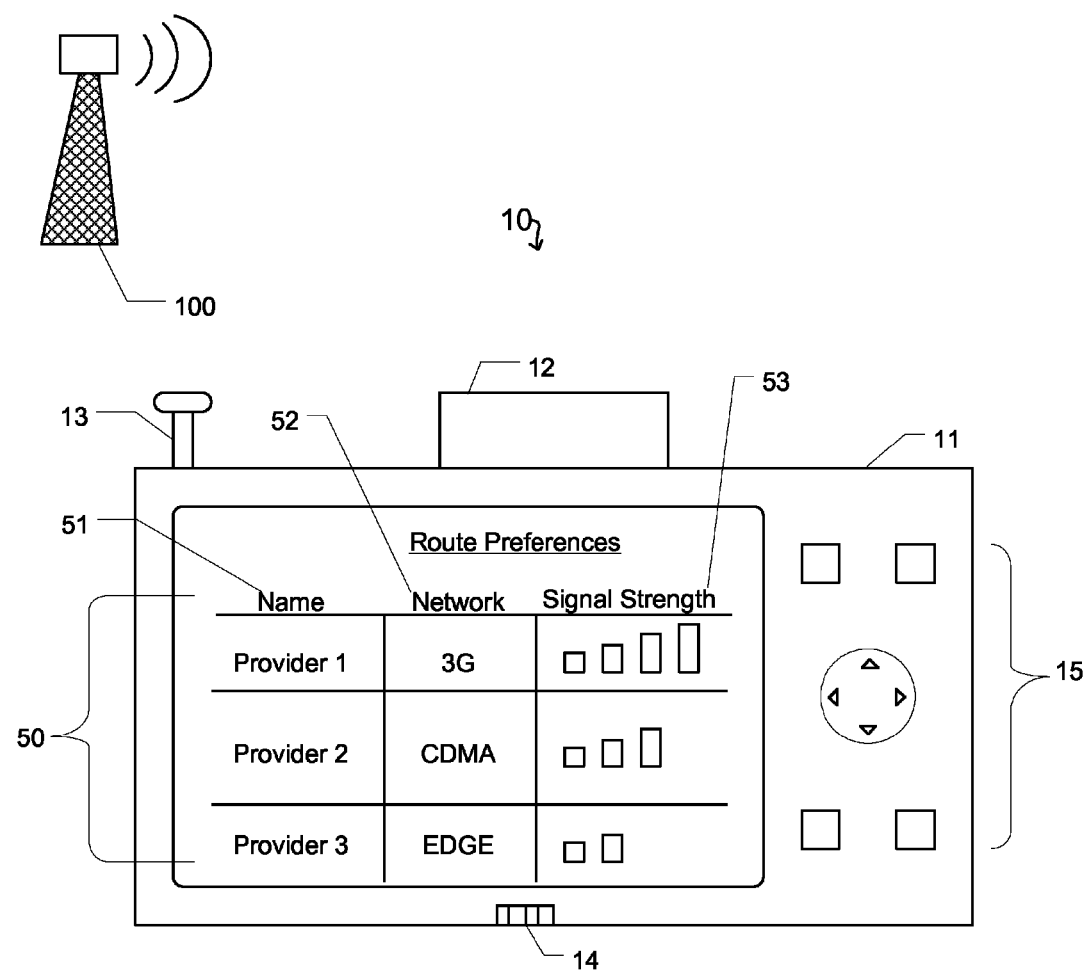
FIG. 5 is a front view of the GPS navigation and cellular route planning device according to another embodiment.

FIG. 5 illustrates an alternate embodiment of the GPS navigation and cellular route planning device 10 that further includes the ability to generate instantaneous cellular provider information. As shown, the cellular antenna 13 can receive cellular information form any local cellular towers 100 and can display a list of available cellular providers 51 on the display screen 16. Additional information pertaining to the network 52 and/or signal strength 53, among others, can also be displayed. It is also noted that the cellular provider information 50 listed on the display screen can be information pertaining to all available cellular providers for the area in which the device 10 is located or can be restricted to information about cellular providers who have provided the cellular route information to the device.

Figure 6:
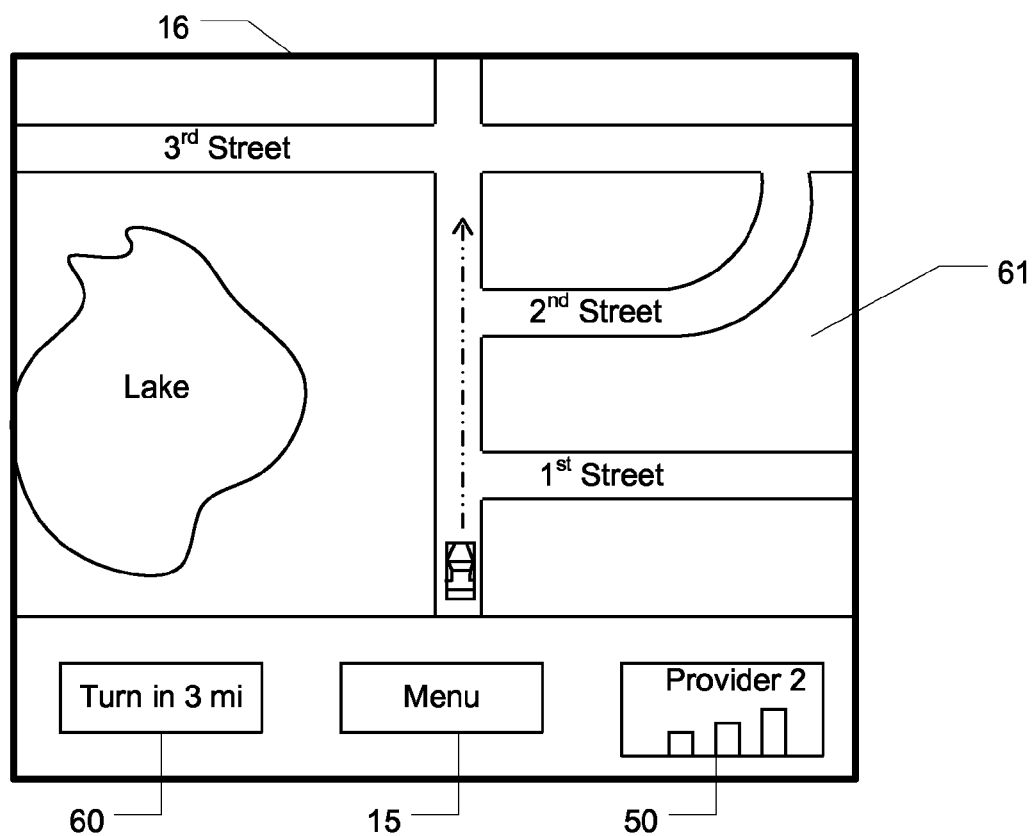
FIG. 6 is a front view of the screen of the GPS navigation and cellular route planning device according to another embodiment.

FIG. 6 illustrates another alternate embodiment of a GPS navigation and cellular route planning device 10 in which cellular provider information 50 is displayed along side driving instructions 60 and a generated map 61. Such a feature can be utilized, for example, in conjunction with the cellular route preference described above in order to allow a user to see the signal strength and/or other details of the service provider at all times along their journey.

In another embodiment (not illustrated), the device 10 is capable of comparing actual cellular provider information (i.e. list of providers, signal strength, etc.) for a given area, as determined by the cellular antenna, to the cellular routing information provided to the device via the I/O unit.

To this end, the device 10 can identify discrepancies (i.e. deltas) in which the actual information (provided by the antenna 13) conflicts with the cellular routing information provided by the manufacturer. When a delta is identified, the device 10 can store the information in the memory and report the delta to the map supplying entity when the unit is next updated. Such a feature can allow the device to act as a tool for improving the accuracy of the cellular routing information.

Accordingly, the above described GPS navigation and cellular route planning device is capable of incorporating the coverage details of a particular cellular provider into a proposed route for a user, thus ensuring constant cellular communication at all times during a trip. Additionally, the device can display available cellular provider information and act as a tool for improving the cellular routing information supplied by a manufacturer or third party vendor.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A navigation and cellular route planning device, comprising:
   a GPS receiver for receiving GPS signals;
   a cellular receiver for receiving real time cellular provider information;
   a memory that is loaded with navigation data, and cellular routing information that includes at least one cellular provider network coverage map indicating locations where cellular telephone coverage is present or absent;
   a processor connected with each of said GPS receiver, cellular receiver, and memory, said processor functioning to generate travel instructions wherein cellular telephone coverage is available based on the stored cellular routing information; and a display connected to the processor and configured to display one or more of the travel instructions, data from the GPS receiver, and cellular provider information from the cellular receiver.

2. The navigation device of claim 1, wherein cellular provider information includes at least one of a cellular provider identity, cellular network information, cellular signal strength and a cellular network type.

3. The navigation device of claim 2, wherein the processor is configured to identify a delta, said delta indicating a discrepancy between the stored cellular network coverage map and the real time cellular provider information from the cellular receiver.

4. The navigation device of claim 3, wherein the memory is configured to store the delta.

5. The navigation device of claim 4, further comprising:
a connection unit that is configured to communicate with an external device and to send information pertaining to the identified delta thereto.

6. The navigation device of claim 5, wherein the cellular routing information is received via the connection unit.

7. The navigation device of claim 3, wherein the processor is further configured to generate alternate travel instructions based on the identified delta.

8. The navigation device of claim 1, wherein the device is a stand alone portable unit.

9. The navigation device of claim 1, wherein the device is incorporated into a vehicle as a single unit.

10. The navigation device of claim 1, wherein the device is incorporated into a vehicle as multiple modules that are communicatively linked.

11. The navigation device of claim 1, wherein the processor is configured to generate the travel instructions when the device is not connected to an outside network.

12. The navigation device of claim 1, wherein the cellular routing information is pre-loaded into the device memory.

13. The navigation device of claim 1, wherein cellular telephone coverage consists of voice service.

14. A navigation and cellular route planning device, comprising:
means for receiving GPS signals;
means for receiving real time cellular signals provider information;
means for storing navigation data and cellular routing information that includes at least one cellular provider network coverage map indicating locations where cellular telephone coverage is present or absent;
means for processing the navigation data, cellular routing information, GPS signals and cellular provider information;
means for generating travel instructions wherein cellular telephone coverage is available based on the stored cellular routing information; and
means for displaying one or more of the travel instructions, GPS data, and cellular provider information.

15. A method for generating travel instructions based on cellular provider information, said method including:
storing, via a memory, geographic navigation data cellular routing information that includes at least one cellular provider network coverage map indicating locations where cellular telephone coverage is present or absent;
receiving GPS signals via a GPS receiver;
determining a current location;
receiving a destination location;
receiving a cellular provider preference instruction, and storing the same within the memory;
identifying the destination location within the geographic data stored in the memory;
generating, via a processor, initial travel instructions based on the destination location and the received cellular provider preference instruction;
identifying any portions of the initial travel instructions that do not have cellular telephone coverage, based on the cellular routing information and cellular provider preference stored in the memory;
saving the initial travel instructions up to a first portion identified as not having cellular telephone coverage;
generating additional travel instructions from the first identified portion to the destination based on the cellular routing information and cellular provider preference stored in the memory until all travel instructions are identified as having cellular telephone coverage; and
displaying a final travel instructions on a display, said final travel instructions including the initial travel instructions and the additional travel instructions.

16. The method of claim 15, further comprising:
receiving, via a cellular receiver, real time cellular provider information; and
displaying the real time cellular provider information.

17. The method of claim 16, further comprising:
identifying a delta that indicates a discrepancy between the stored cellular network coverage map and the real time cellular provider information from the cellular receiver; and
storing the delta in the memory.

18. The method of claim 17, further comprising:
generating alternate travel instructions wherein cellular telephone coverage is available based on the identified delta.

* * * * *